UNITED STATES PATENT OFFICE.

THOMAS L. WILLSON, OF OTTAWA, ONTARIO, CANADA.

PRODUCING METALLIC SILICID.

No. 847,300.        Specification of Letters Patent.        Patented March 12, 1907.

Original application filed April, 11, 1904, Serial No. 202,636. Divided and this application filed November 5, 1906. Serial No. 341,991.

*To all whom it may concern:*

Be it known that I, THOMAS L. WILLSON, a subject of the King of Great Britain, residing at Ottawa, Province of Ontario, Canada, have invented certain new and useful Improvements in Producing Metallic Silicids, of which the following is a specification.

In my application for patent, Serial No. 202,636, filed April 11, 1904, I have described a process of smelting metallic ores or compounds containing silica, or to which silica is added, whereby a metallic silicid may be produced. The invention described therein relates to the treatment of silicates or sulfids of nickel, iron, or copper to produce silicids of these metals, either singly or alloyed. The present application is a division of that above referred to and relates specifically to the treatment of sulfids.

The process is characterized generically by the treatment of a metallic ore or compound by the addition of lime, (or its equivalent,) silica, (if not already contained in sufficient quantity in the ore,) and carbon, and subjecting the mixture to a sufficiently intense heat for a sufficient time to bring about the necessary reduction and reactions. Practically the heat of the electric furnace is essential, and where I speak of "electrosmelting" it is to be understood that I refer to smelting at a temperature materially above ordinary furnace temperature and such as can be attained practically only in electric furnaces. If the ore contains sulfur, a proportionately greater quantity of lime is required. The resulting product is a silicid of the metal or metals of the ore or compound. Thus with a nickel ore the product is a nickel silicid, and with a nickel-iron ore it is a ferronickel silicid. The remaining products of the reactions are either volatilized or discharged as slag.

As one illustration of the practice of my invention I will take the case of nickel sulfid, to which is added lime, silica, and carbon in suitable proportions, the mixture being heated in an electric furnace, thereby reducing the lime and silica, the calcium combining with the sulfur of the nickel sulfid and forming calcium sulfid, which floats as a slag, and the silicon uniting mainly with the nickel to form nickel silicid. As another illustration I may mention the application of my process to the recovery of iron from the worthless form of iron silicate containing sulfur, which is now a waste product in the reduction of nickel-sulfid ores. This material contains already a large percentage of silica, so that it is unnecessary to add silica. I add a suitable proportion of lime and carbon and smelt in the electric furnace, producing calcium sulfid, which floats off, and iron silicid. If the iron silicate contains nickel, this will appear in corresponding proportion in the resulting silicid.

My invention is valuable in its application to nickel and iron sulfid ores, which ores contain usually a small proportion of copper. With such ores I add a suitable proportion of limestone, silica, and carbon. If this mixture were smelted in a blast-furnace, there would result a calcium silicate of iron and a nickel-copper matte; but by the more active reduction obtainable by electric smelting calcium and silicon are freed, the calcium uniting with the sulfur of the ore and forming calcium sulfid, which floats off, and the silicon uniting with the nickel and iron, forming a ferro-nickel silicid. Some of the silicon also combines with the sulfur to form silicon sulfid, which is volatile.

Theoretically the required proportions should be obtainable thus: Enough lime or limestone should be added calculated to CaS to combine with the total sulfur in the ore. Enough silica should be added to form with the calcium equivalent thus determined $CaO(SiO_2)_2$. Then enough carbon should be added to liberate from the calcium silicate the calcium and silicon, the former uniting with the sulfur and the latter with the iron and nickel. In practice, however, it is found with sulfid ores that a considerably smaller proportion of lime, silica, and carbon than theoretically indicated may be successfully used. For example, in an electric furnace using about thirty-five volts and four thousand amperes the process has been successfully practiced with only half the theoretical proportions of lime, silica, and carbon. This is probably explainable by the action of the intense heat of the furnace in dissociating sulfur, which is volatilized and driven off and could doubtless be recovered as a by-product. Probably this effect would be even greater with a larger electric furnace generating greater heat.

For the guidance of those skilled in the art I will give in detail the results obtained in operating with a ferro-nickel-sulfid ore of the following properties, namely: iron, forty-four to forth-eight per cent.; nickel, four to seven per cent.; copper, one to two per cent.;

sulfur, twenty-six to twenty-eight per cent.; insoluble, (diorite,) fourteen to twenty-two per cent. To three hundred pounds of this ore suitably crushed add one hundred and twenty pounds of crushed limestone, ninety-eight pounds of sand, and one hundred and seven pounds of granulated coke. Mix these well together and feed gradually into a Willson electric-arc furnace in the same manner as in the manufacture of calcium carbid. Energizing the furnace with thirty-five to thirty-seven volts and four thousand amperes, the reduction of this quantity of material will require from two to three hours if started cold. The resulting ferro-nickel silicid has analyzed as follows: iron, 75.6 per cent.; nickel, 9.4 per cent.; silicon, 12.46 per cent.; sulfur .635 per cent.; copper, .76 per cent.; unascertained impurities, 1.145 per cent.; total, 100.000.

In running continuously since the calcium sulfid remains in the furnace when the silicid is tapped off the quantity of lime or limestone used may be greatly diminished after the first few hours, the proportion of sand being correspondingly increased, thereby cheapening the process. For the more complete elimination of the sulfur the heat of the electric furnace may be increased, or the proportion of silica may be increased, or fluor-spar may be added, preferably shortly before tapping off the product, introducing it preferably with a blast of air through twyers. Except for its greater cost fluor-spar (calcium fluorid) might be used to wholly or partly replace the lime or limestone.

It is to be understood that in the practice of my process limestone may be used instead of lime or magnesia (in the form of dolomite, for example) or any other basic compound, as an oxid of an alkaline-earth metal, may be substituted as the equivalent of lime, lime (or limestone) being preferable to other compounds of this class because of its cheapness. The compounds referred to are either natural (ores) or artificial and may contain other impurities than those specifically mentioned.

What I claim is—

1. Treating a compound containing nickel sulfid by adding a basic compound, silica and carbon, and electrosmelting to form a basic sulfid which slags off, and a nickel silicid.

2. Treating a compound containing an iron-nickel sulfid by adding silica, a basic compound and carbon, and electrosmelting, to produce a ferro-nickel silicid.

3. Treating a compound containing sulfur iron and nickel, by adding lime, silica and carbon, and electrosmelting, to produce a ferro-nickel silicid.

In witness whereof I have hereunto signed my name in the presence of two subscribing witnesses.

THOMAS L. WILLSON.

Witnesses:
 DOMINGO A. USINA,
 FRED WHITE.